Jan. 23, 1962

W. MANN ETAL 3,017,961

COMBINATION BRAKE

Filed Nov. 29, 1956

Witness:
Paul K. Gallagher

INVENTORS.
William Mann
Bernard Maloney
By: Walter S. Schlegel, Jr.
Atty.

Jan. 23, 1962 W. MANN ETAL 3,017,961
COMBINATION BRAKE
Filed Nov. 29, 1956 2 Sheets-Sheet 2

Witness:
Paul H. Gallagher

INVENTORS.
William Mann
Bernard Maloney
By Walter L. Schlegel, Jr.
Atty.

United States Patent Office 3,017,961
Patented Jan. 23, 1962

3,017,961
COMBINATION BRAKE
William Mann and Bernard Maloney, Gary, Ind., assignors to American Steel Foundries, Chicago, Ill., a corporation of New Jersey
Filed Nov. 29, 1956, Ser. No. 625,155
15 Claims. (Cl. 188—57)

The present invention relates to a brake and more particularly to a railway car brake.

An object of the invention is to provide a novel combination brake arrangement including a wheel brake and an off-wheel brake.

Another object is to provide a lever and linkage arrangement for effecting self-adjustment and self-alignment of the brakes.

A further object is to provide a novel parallel link arrangement for effecting self-adjustment and self-alignment of the brakes.

A still further object is to provide a novel double parallel linkage arrangement for carrying the brakes of the character mentioned, including a first set of parallel links carrying the brakes for moving them in applying and releasing directions and maintaining them aligned, and a second set of parallel links for supporting the first set, at least one of which is an actuating lever, mounted on a fixed portion of the railway car.

Other objects and advantages of the invention will appear from the following detail description taken in conjunction with the accompanying drawings, in which.

Figure 1:
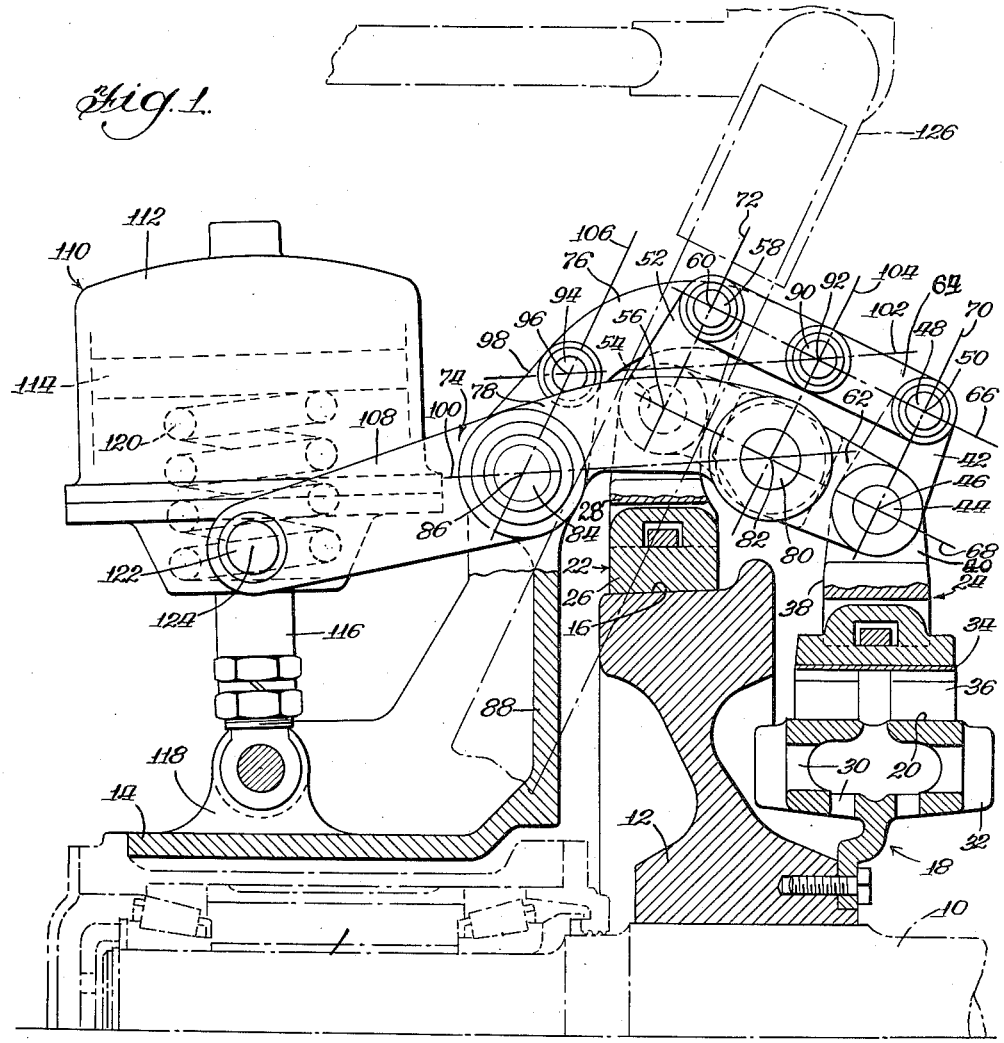
FIGURE 1 is an elevational view of the novel device of the present invention embodied in a railway car truck, portions being shown in elevation and other portions in section.

Referring in detail to the drawings, the mechanism of the invention as illustrated, is embodied in or mounted on a wheel and axle assembly having conventional construction. The axle 10 is supported by wheels 12, one of which is shown, a journal box 14 being provided at the end of the axle, in the usual manner.

The wheel 12, as is usual, is of iron and has a tread surface 16 which also serves as a braking surface. Mounted inboardly of the wheel is a rotary disc 18 secured to the wheel in the customary manner for rotation therewith. The disc 18 includes a peripheral braking surface 20.

Cooperating with the braking surfaces 16 and 20 are brakes 22 and 24, respectively. The brake 22 includes a brake shoe 26 preferably of iron and a brake head 28 by which the brake shoe is supported. This form of brake shoe and head is conventional and it is believed not necessary to describe it in detail.

The disc 18 and brake 24 are different in character from the wheel 12 and brake 22, and may be of the character disclosed in detail in the copending application of the present inventors, Serial No. 524,548, filed July 26, 1955, now Patent No. 2,930,450. The brakes 24 and and 22 in cooperation with their braking counterparts, namely, the disc 18 and wheel 12 produce different kinds of braking action and the combined effect of these kinds of braking action produce a certain desired braking result, as best seen in FIGURE 1, the disc 18 is preferably of lesser diameter than wheel 12; the specific character of which need not be entered into here. Suffice it to say that the braking actions are different and the two brakes 24 and 22 are applied and released simultaneously. The brakes are self-adjusted and self-aligned, as will be explained in detail hereinbelow.

The disc 18 and brake 24 are of such construction as to be relatively self-cooling, the disc including certain apertures 30 and vanes 32 for enabling passage of air therethrough. The brake 24 includes a brake shoe 34 having shoe pads 36 with passages therebetween, and engaging certain portions of the braking surface 20 of the disc.

The brake head 38 of the brake 24 includes a plurality of upstanding lugs 40, the central one of which has an extension 42 projecting beyond the side lugs. The lugs have aligned apertures for receiving a pivot element such as a pin 44 defining an axis 46 (FIGURE 1). The upper end of the extension 42 also is apertured for receiving a pivot element such as a pin 48 defining a pivot axis 50. The extension 42 may also be referred to as an arm, and as a link which enters into a parallel link arrangement.

The brake head 28 of the brake 22 similarly has one or more, and preferably two, upstanding lugs 52 with aligned apertures for receiving a lower pivot element such as a pin 54 defining an axis 56 and an upper pivot means such as two aligned pin elements 58 defining an axis 60. The lugs 52, or at least the upper portions thereof, may also be referred to as arms or links.

The arms or links 42 and 52 are interconnected by parallel links 62 and 64 which for convenience in reference thereto will be referred to as primary and secondary links, respectively. These links are connected with the arms or links 42 and 52 to form a floating linkage parallelogram or parallel link arrangement, being mutually pivotal on the respective pins 44, 48, 54 and 58. For the purpose of providing strength and stability in the linkage arrangement for resisting torque developed, the various links in most instances are made up of a pair of link elements spaced apart in the direction of the axes about which they are pivoted. In the function of the links from the standpoint of their operation in parallel linkages, these pairs of link elements may be referred to simply as single links. Thus the arm or link 42 is a single element since it is centrally positioned for the sake of compactness in the assembly, but it serves the same purpose as if two or more such similar link elements were spaced along its pivotal axes and similarly connected. The links mentioned form a parallel linkage and for convenience in reference thereto attention is directed to lines drawn through certain related pivot axes as follows: line 66 drawn through axes 50 and 60; line 68 drawn through axes 46 and 56; line 70 drawn through axes 46 and 50; and line 72 drawn through axes 56 and 60. Sines 66 and 68 remain parallel as do lines 70 and 72.

Figure 2:
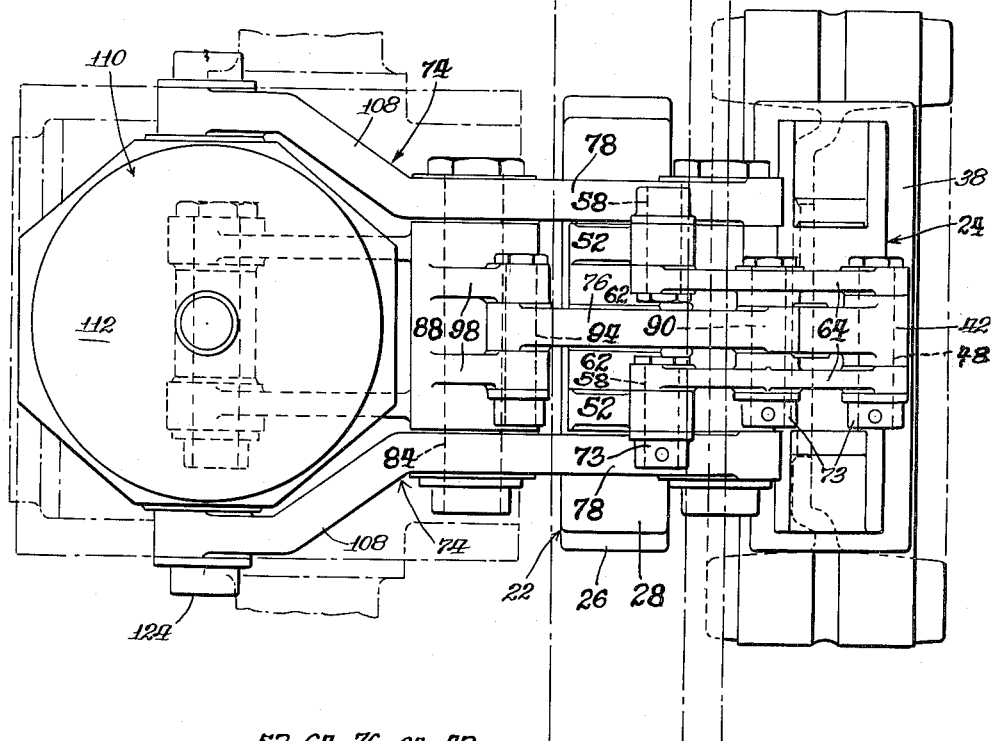
FIGURE 2 is a plan view.

The links just described, namely, 42, 52, 62, and 64 may be referred to as a first set of parallel links and they are arranged for movement toward and from the wheel 12 and disc 18 for applying the brakes to and releasing them from the respective braking surfaces. This set of links is movable bodily in the manner stated and moves the brakes 22 and 24 in unison in the directions stated. The links 62 and 64 are enabled to pivot about the various axes mentioned, namely, 46, 50, 56 and 60 when necessary force is applied to the system, but in order to minimize such pivoting movement and to eliminate it in the absence of the external forces, substantial friction is provided between the various links. Such friction may be effected merely by providing tight connections between the links or it may be provided by the interposition of friction developing means, such as springs, at the link connections. The latter arrangement may include, for example, springs in nuts 73 (FIGURE 2) for effecting the desired friction of such character as disclosed in the copending application of Carl E. Tack, Serial No. 241,829, filed August 14, 1951, now patent No. 2,768,713.

The means for mounting the above described first set of parallel links includes a second set of parallel links. The latter links include a primary link 78 and a secondary link or equalizer bar 76. In the present instance the primary link 78 includes a pair of axially spaced link elements (FIGURE 2) while the secondary link 76 is centrally disposed, and consists of a single link element. The primary link 78 is constituted by the inner portion of a brake or actuating lever 74 pivoted at its inboard end to the primary link 62 of the first set, the various links being apertured for reception of pivot means 80 in the form of a pin defining an axis 82. The lever 74, at the outer end of the link portion 78, is also apertured for receiving a pivot element such as a pin 84 defining an axis 86. The pin 84 is also extended through apertures in an upstanding rigid portion or bracket 88 of the journal box 14 which provides the mounting means for the lever 74 and, therethrough, the first set of links and the brakes.

The secondary link 76 of the second set of parallel links is pivoted at its inboard end to the secondary link 64 of the first set, being apertured at its inner end to receive pivot element 90 in the form of a pin defining an axis 92, the pin also being fitted in apertures in the primary link elements 64. The outboard end of the secondary link 76 is apertured for receiving a pivot element such as a pin 94 defining an axis 96, the pin being also fitted in apertures in upstanding portion 98 of the journal box bracket 88.

Referring to the second set of parallel linkage, attention is directed to lines interconnecting certain axes thereof for convenience in reference thereto. These lines include line 100 interconnecting axes 86 and 82; line 102 interconnecting axes 96 and 92; line 104 interconnecting axes 82 and 90; and line 106 interconnecting axes 86 and 96. The lines of each pair, namely, the lines 100, 102 and the lines 104, 106 remain always parallel, in keeping with the nature of parallel links.

The primary link 78 serves as the means for raising and lowering the first set of parallel links while the link 76 serves primarily as a guiding link. The outboard arm extension 108 of the lever 74 is connected with power means 110. The power means 110 may be a conventional device such as an air cylinder and piston, including a cylinder 112 and piston 114, the piston rod 116 of which is extended from the cylinder and connected to the journal box 14 in a bracket 118 provided for the purpose. Upon introduction of compressed air into the cylinder above the piston, the cylinder is extended, and upon release of such compressed air the cylinder is contracted by means of a compression spring 120 and gravity acting on the cylinder. The connection between the power means and the primary lever 74 includes a pivot means such as pin 122 defining an axis 124. This pin consists of pin elements on opposite sides of the cylinder and fitted in the apertures in the respective lever elements making up the arm 108. Upon extension of the power means, the lever 74 is rotated clockwise (FIGURE 1) and the brakes are applied, while upon contraction of the power means the lever 74 is rotated counterclockwise and the brakes are released.

The torque from the brakes is imparted to the link elements of the lever 74. The spaced elements of the lever are preferably spread apart along their pivotal axes a substantial distance (see FIGURE 2) in order to better withstand the torque, and the torque is transmitted from this link to the journal box 14. The journal box is arranged in suitable connection with the railway car frame which may take any of various suitable forms. It may include a pair of rods 126 arranged in the form of a V with the extensions of the arms connected to points on the journal box spaced apart in direction transverse to the axle axis, and its upper end constituting the juncture of the rods connected to a fixed portion of the railway car which in the present instance may assume the specific form of another pair of rods (not shown) in the form of a V, having their juncture connected to the juncture of the rods 126 and their extended ends connected to suitable points on the railway car.

Figure 4:
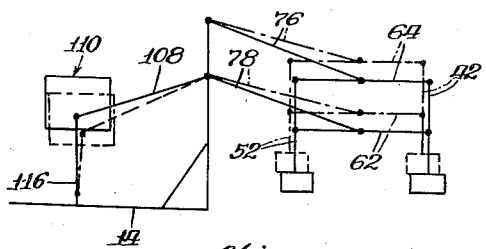
FIGURE 4 is a diagrammatic view showing different positions of certain links.
Figure 5:
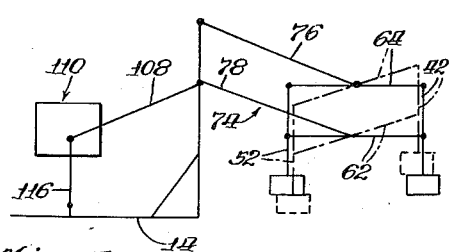
FIGURE 5 is a diagrammatic view similar to FIGURE 4 but showing other links in different positions.
Figure 3:
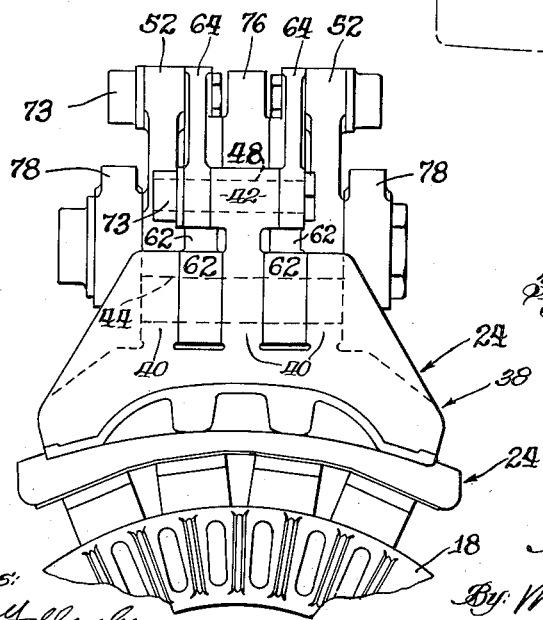
FIGURE 3 is an end view from the right of FIGURE 1.

Attention is directed to FIGURES 4 and 5 for an analysis of the function of the linkages. The links in FIGURES 4 and 5 are distorted from their true shape in the practical application such as in FIGURES 1 to 3, for the sake of facilitating visualization thereof.

Assume first, actuation of the lever 74. In FIGURE 4, the full line position indicates the power means as being in extended position with the brakes applied, while the dotted lines indicate the opposite position, namely, the power means contracted and the brakes released. In the movement of the elements between the full line and dotted line positions, the links 78 and 76, it will be noted, remain parallel. The first set of links, namely, 64, 62, 42 and 52 remain in the same parallelogram arrangement. The friction between the respective links of this set of parallel links prevents any pivotal movement between the links thereof in movement of the brakes out of engagement with the braking surfaces. As a consequence, the brakes are moved in unison both in applying them to the respective braking surfaces and removing them therefrom, without one being first moved in the intended direction and forming a point of reaction for movement of the second one. However, in the event misalignment should occur, such as through wear, self-adjustment is effected since the power brought to bear in applying the brakes is substantially greater than the friction between the links of the sets; hence, automatic self-adjustment.

FIGURES 4 and 5 show the links 62 and 64 of the first set of parallel links as being substantially horizontal. In the practical embodiment, as shown in FIGURE 1, these links are disposed at a substantial angle to the horizontal. Features of construction of the railway car concerning elements other than the braking means may render it convenient to dispose the links at such an angle rather than in the horizontal. However, the relation between the links when disposed at an angle such as in FIGURE 1 remains identical with that when arranged as in FIGURE 4 where it will be observed that the parallel linkage arrangement is adapted to various positions and orientations. The links always remain parallel. Moreover, the links 42 and 52 remain mutually parallel and the brakes 24 and 22, while disposed at an angle to the link portions 42 and 52 connected thereto, are disposed mutually parallel and facing in the direction of their respective braking surfaces. Thus any pivoting of the links 42, 52, 62, 64 maintains these brakes in proper orientation with respect to the braking surfaces.

The links 78 and 76 of the second set of parallel links are connected to the links 62 and 64 of the first set and hence the latter links remain constantly in the same spaced relation along the line 104. On the other hand, the links 42 and 52, while remaining parallel, may move toward or from each other, but this relative movement is very slight and the alignment of the brakes with their respective braking surfaces remains, as a practical matter, constant. Any misalignment because of the movement of the links 42 and 52 toward or from each other would not affect their proper practical engagement with the respective braking surfaces.

FIGURE 5 shows a variant position of the first set of parallel links. The present illustration shows the links 78 and 76 in stationary position, but shows alternate positions of the second set of parallel links. The latter, namely, links 62 and 64 may pivot about their respective axes, namely, 82 and 92 but they remain relatively parallel. The links 42 and 52 and the brakes connected thereto remain mutually parallel, and aligned with the respective braking surfaces, as described above.

The lever 74, as will be understood from the foregoing, serves as the operating means for moving the first set of parallel links while the secondary link 76 serves as a guiding link maintaining the first set of parallel links constantly oriented bodily, while the links of the first set remain in relatively fixed position normally and until unusual forces are applied thereto.

We claim:

1. A brake arrangement for a railway car truck including a wheel and axle assembly having a wheel and a disc coaxial and rotatable therewith, comprising a pair of brakes engageable with the wheel and disc, respectively, a pair of floating parallel links pivotally connected to both the brakes at corresponding ends of the links, means pivoted to the links at corresponding points spaced from said first mentioned connections and operable to support the parallel links for movement radially of the wheel and disc for applying and releasing the brakes, power means for so moving the parallel links and brakes, and means for retaining the parallel links in relative positions with the brakes facing the respective wheel and disc.

2. A brake arrangement for an axle having a pair of axially spaced and coaxial disc-like rotary members thereon, each having a peripheral braking surface, comprising separate brakes engageable with respective rotary members, a pair of floating parallel links pivotally connected to both brakes at corresponding ends of the links, and means pivoted to the links at corresponding points separate from said first mentioned connections and operable to support the parallel links for movement radially of the rotary members for correspondingly moving the brakes to and from the respective braking surfaces, said last means having an actuating arm for connection with power means and including means retaining the parallel links in such relative positions as to maintain the brakes facing the respective braking surfaces.

3. A brake arrangement for a railway car truck having a wheel and axle assembly including a wheel and a coaxial disc spaced axially from and rotatable with the wheel; comprising a pair of brakes engageable with the opposite ends of the links, a second set of parallel links pivotally connected to both the brakes at corresponding opposite ends of the links, a second set of parallel links pivotally connected at corresponding ends to the first set, at corresponding points separate from the connections between the first set and the respective brakes, and pivotally connected at opposite corresponding ends to a fixed portion of the car truck, at least one of the links of the second set having an actuating arm extension for connection to operating means.

4. A brake arrangement for a railway car truck having a wheel and axle assembly including a wheel member and a coaxial disc member spaced axially from and rotatable with the wheel mmeber; comprising a pair of brakes engageable with respective members, a first set of parallel links including a primary link and a secondary link parallel thereto, transverse links pivotally connected at spaced points to the primary and secondary links, the transverse links having extensions mounting said brakes, a second set of parallel links pivoted at one end in a fixed portion of the car truck and pivoted at the opposite end to respective ones of the primary and secondary links of the first set at points on the latter intermediate the corresponding points of connection between the transverse links and the primary and secondary links, at least one of the links of the second set having an extension forming an actuating arm for connection with operating means.

5. A braking arrangement for a railway car truck having a wheel and axle assembly including a wheel member and a coaxial disc member spaced axially inboard of and rotatable with the wheel, the wheel member and disc members having peripheral braking surfaces, said arrangement comprising a pair of brakes for the respective members, the brakes having arms extending therefrom in parallel relation, links pivoted to said arms forming parallel link connection, an operating arm pivoted at one end to one of said links, and at an intermediate point to a fixed portion of the car truck with an extension beyond the latter point for connection with operating means for swinging the arm, and an additional link pivoted at one end on the car truck and at its other end to an intermediate point on the other one of the first said links and operative for maintaining said arms on the brakes mutually parallel and the brakes directed in radial direction toward the respective braking surfaces.

6. A braking arrangement for a railway car truck having a wheel and axle assembly including a wheel member and a coaxial disc member spaced inboardly from and rotatable with the wheel member, the wheel and disc members having peripheral braking surfaces, comprising a pair of brakes for respective members, each brake having an arm, a first set of parallel links pivoted at corresponding opposite ends to both of said arms, each of the links of the set including a pair of link elements spaced apart in the direction of their pivot axes, said arms on the brakes including a single arm element on one of the brakes between the links and a pair of arm elements on the other spaced apart outwardly of the link elements, a second pair of parallel links including a first link made up of axially spaced link elements outwardly of the first set with one end pivoted to corresponding link elements of the first set at points intermediate the ends of the latter and pivoted intermediate their own ends in a fixed portion of the car truck and having their other ends extended outboardly of the wheel, the second set of links also including another link consisting of a single element centrally disposed between the link elements of the first set and pivoted at one end in the link elements of the first set and at its other end in a fixed portion of the car truck, cylinder-piston power means mounted on the car truck having a piston connected to the car truck and a movable cylinder between and connected to the extended ends of the first link elements of the second set.

7. The construction of claim 3 in which the disc is inboard of and of lesser diameter than the wheel and the parallel links of said first set are disposed at an angle generally corresponding to the inclination of a line between peripheral surfaces of the wheel and disc in an axial plane.

8. In a brake for a shaft having braking surfaces spaced axially therealong; the combination of a first parallelogram linkage, brake means carried by said linkage for braking respective surfaces, a second parallelogram linkage having fixed spaced pivots and having spaced pivotal connections to said first linkage at corresponding points spaced from the points where said first linkage is connected to the brake means, and means connected to the second linkage for actuating the brake.

9. In a combination brake arrangement for a railway car truck comprising a frame and a supporting wheel and axle assembly including a wheel and a rotor attached to said assembly for rotation with said wheel, the combination of: a pair of friction means engageable with peripheral surfaces presented by the wheel and rotor respectively; a pair of lugs extending outwardly in parallel positions from the respective friction means; a pair of floating parallel links interconnecting said lugs, said links being spaced from each other radially with respect to the rotational axis of said assembly; a power cylinder having housing and piston elements, one of said elements being pivoted to the truck frame; a dead brake lever fulcrumed to the frame and interconnecting the other power cylinder element and one of said parallel links; and a dead equalizer bar pivoted at one end to the truck frame and pivoted at the other end to the other of said parallel links.

10. In a brake arrangement for a railway car truck comprising a frame and a supporting wheel and axle assembly presenting a pair of coaxial cylindrical friction surfaces, the combination of: a pair of friction means movable radially of said assembly into and out of engagement with the respective surfaces; a pair of parallel floating links interconnecting the friction means; a dead brake lever fulcrumed to the frame and pivoted to one of said links; a dead equalizer bar pivoted at one end to the frame and at the other end to the other of said parallel links; and means to actuate said brake lever.

11. A brake arrangement according to claim 10, wherein the distance between the pivotal connections of the equalizer bar to the frame and the other parallel link is equal to the distance between the pivotal connections of the brake lever to the frame and the first parallel link.

12. In a brake arrangement for a vehicle comprising a frame and a wheel and axle assembly with a pair of axially spaced rotatable surfaces, the combination of: a pair of friction means engageable with the respective surfaces; a pair of parallel links interconnecting the friction means; an equalizer bar connected at one end to the frame and pivoted at the other end to one of said links; and means connected to the other of said links operable to move said friction means into engagement with said surfaces.

13. A brake arrangement for a railway car truck having a wheel and axle assembly including a wheel member and a coaxial disc member spaced axially from and rotatable with the wheel member; comprising a pair of brakes engageable with the wheel and disc members, respectively, a pair of floating parallel links pivotally connected to both the brakes at corresponding ends of the links, and actuating means pivoted to at least one of the parallel links, at a point spaced from the connections of said one link to the respective brakes, operable to support the parallel links for moving the brakes toward and away from the respective wheel and disc members, other means pivotally connected with a fixed portion of the car truck and pivoted to the other of the parallel links operable to maintain the brakes substantially in lateral alignment with peripheral surfaces of the respective members, and power means having operative connection with the actuating means.

14. A brake arrangement for a railway car truck having a wheel and axle assembly including a wheel member and a coaxial disc member spaced axially from and rotatable with the wheel member, and a journal box constituting a fixed portion of a car truck receiving an end of the axle, comprising a pair of brakes for the respective members disposed above the members and movable vertically into and out of engagement with respective peripheral surfaces thereof, a first set of parallel links pivotally connected to both the brakes at corresponding ends of the links, a second set of parallel links, pivotally connected to the journal box above said members and on an axis transversely of the axis of the wheel and axle and pivotally connected at corresponding ends to respective links of the first set at corresponding points spaced from the connections between the links and the respective brakes, and power means mounted on the journal box having a vertically movable portion connected to an extended end of one of the links of the second set and operative for moving the brakes into and out of engagement with the respective wheel and disc members.

15. A brake arrangement for a railway car truck having a wheel and axle assembly including a wheel member and a coaxial disc member rotatable with the wheel member, said members each having a peripheral braking surface, comprising a pair of brakes for the respective members having parallel arms extending outwardly therefrom, a first set of parallel links pivotally connected at corresponding ends to both of said arms, said arms and links having substantial friction therebetween normally restraining pivotal movement therebetween, a second set of parallel links pivoted to the car truck and pivoted at corresponding ends to respective links of the first set at points intermediate the ends of the latter, one of the links of the second set having an extension for connection with operating means.

References Cited in the file of this patent

UNITED STATES PATENTS

| | | |
|---|---|---|
| 1,397,059 | Scott | Nov. 15, 1921 |
| 2,155,222 | Farmer | Apr. 18, 1939 |
| 2,250,725 | Ransom | July 29, 1941 |
| 2,386,907 | Pierce | Oct. 16, 1945 |

UNITED STATES PATENT OFFICE
CERTIFICATE OF CORRECTION

Patent No. 3,017,961                                            January 23, 1962

William Mann et al.

It is hereby certified that error appears in the above numbered patent requiring correction and that the said Letters Patent should read as corrected below.

Column 2, line 51, for "Sines" read -- Lines --; column 5, lines 38 and 39, for "the opposite ends of the links," read -- the wheel and disc, respectively, --; line 39, for "second" read -- first --; line 52, for "mmeber" read -- member --.

Signed and sealed this 19th day of June 1962.

(SEAL)
Attest:

ERNEST W. SWIDER                                         DAVID L. LADD
Attesting Officer                                              Commissioner of Patents